United States Patent [19]
Peabody

[11] Patent Number: 5,895,862
[45] Date of Patent: Apr. 20, 1999

[54] MANOMETER

[76] Inventor: Steven R. Peabody, 320 W. Ash St., Zionsville, Ind. 46077

[21] Appl. No.: 08/806,518

[22] Filed: Feb. 24, 1997

[51] Int. Cl.$^6$ ............................................. G01L 7/18
[52] U.S. Cl. ............................................. 73/747
[58] Field of Search ..................... 73/747, 748, 749, 73/750

[56] References Cited

U.S. PATENT DOCUMENTS

| | | | |
|---|---|---|---|
| 618,049 | 1/1899 | Barnard et al. | 73/748 X |
| 801,202 | 10/1905 | Barrus | 73/747 |
| 913,321 | 2/1909 | Thomas | 73/747 |
| 1,643,886 | 9/1927 | Goodman | 73/747 |
| 1,812,152 | 6/1931 | Jensen | 73/747 |
| 1,815,000 | 7/1931 | Durant | 73/747 |
| 1,917,846 | 1/1933 | Klopsteg | 73/747 X |
| 2,167,449 | 7/1939 | Ganser | 73/747 |
| 2,603,210 | 7/1952 | Puig | 73/748 X |
| 2,662,409 | 12/1953 | Dwyer | 73/747 |
| 3,316,766 | 5/1967 | Jones | 73/748 |
| 4,297,889 | 11/1981 | Buchanan et al. | 73/747 |
| 4,380,173 | 4/1983 | Wozniak | 73/747 |
| 4,455,876 | 6/1984 | McPherson et al. | 73/747 |
| 4,535,634 | 8/1985 | Troutman, Jr. et al. | 73/747 |
| 4,683,756 | 8/1987 | Derleth et al. | 73/747 |

*Primary Examiner*—Richard Chilcot
*Assistant Examiner*—Paul D. Amrozowicz
*Attorney, Agent, or Firm*—Robert A. Spray

[57] ABSTRACT

A dual-action disconnect valve mechanism for a double column manometer that simultaneously disconnects both tubes of the manometer from external pressure regions or sources, and a fluid displacement reservoir conveniently adjustable for varying the device's reservoir capacity and the height of liquid in the tubes, this adjustment being by a screw type adjustment which easily and conveniently achieves an accurate condition of the liquid levels being substantially exactly at the zero calibration marking. The concepts provide that supplying the manometer liquid at a precise height along the calibration scale without having to move the scale relative to the tubes.

2 Claims, 4 Drawing Sheets

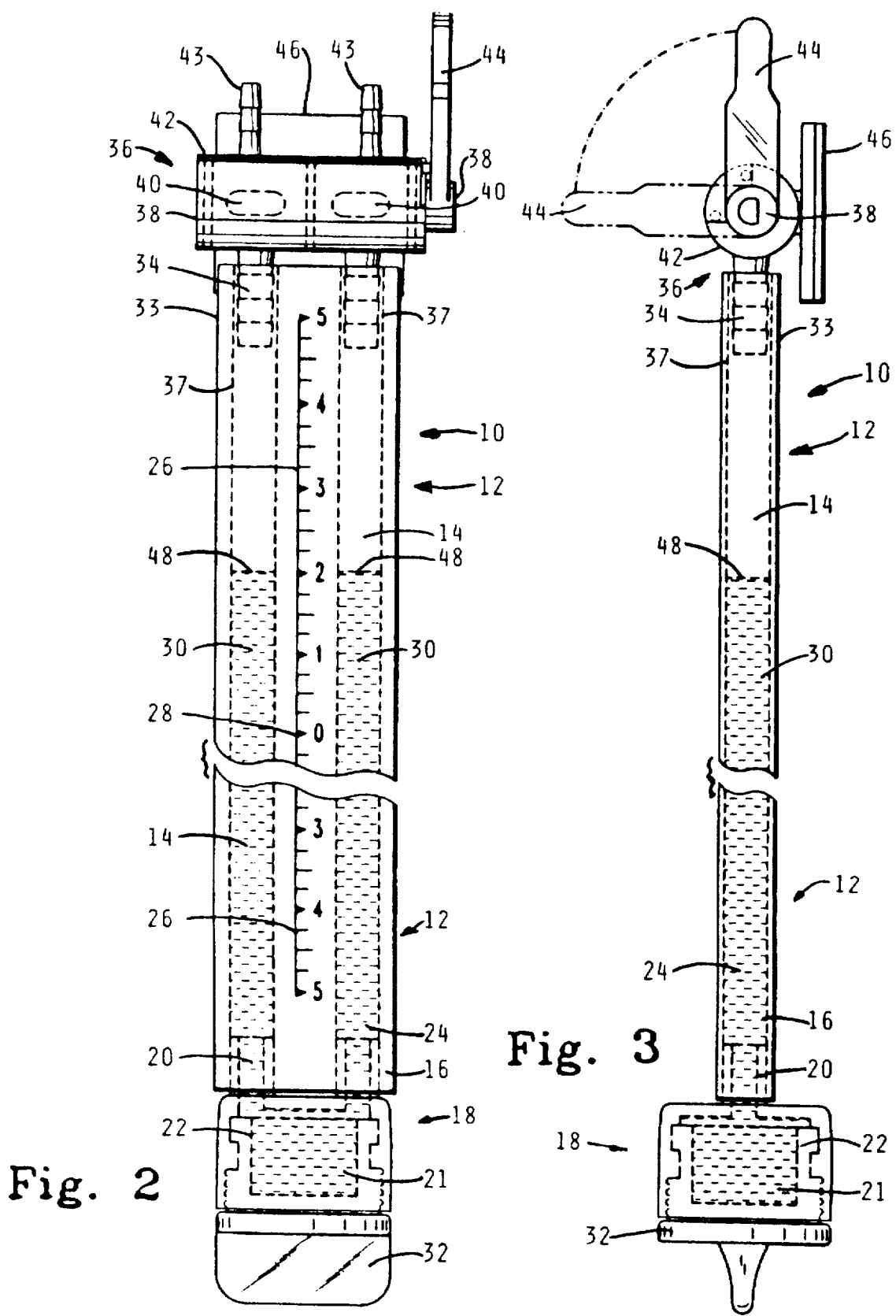

MANOMETER

FIELD AND BACKGROUND OF THE INVENTION

The present invention relates to manometers (pressure gauges), and more particularly to improved manometers having advantages over known pressure gauges of manometer type.

Still more particularly the present invention relates to flexible U-tube manometers which provide a combination of features, providing for such manometers the advantages of a dual-action disconnect valve and a fluid displacement-reservoir having a displacement adjustment for zeroing out the levels of liquid in the fluid tubes, by the means, features, and combinations thereof which are novel in manometers of this nature.

PROBLEMS INHERENT AS TO THE PROVISION OF THESE FEATURES IN A FLEXIBLE STRAP-TYPE MANOMETER

Manometers of the liquid-column type, using the flexibility of liquid such as water or mercury (called "column type" manometers), in contrast to "anaeroid type" manometers (which utilize the principle of a curved flexible tube whose curvature changes according to pressure) have been known and used for several decades; and the development of the state of the art of such column-type manometers has been a matter of helpfulness to details in several respect, even to flexible strap-type of double column or U-tube basic nature.

However, none of the inventions in this significant and specialized field have satisfactorily addressed the features of advantage of the present invention, as are more specifically mentioned in reference to Prior Art of reference.

For instance, in attempting to solve the problem of zeroing out the levels of the liquid in both tubes, a task which is difficult to do accurately, the prior art has gone to the expense of providing a slidable scale-strip, whereas the present invention economically solves the problem by a simple screw-threaded volume adjustment.

For whatever one or more of such considerations have been significant, the important advantages of the present invention have not been fully attained.

SUMMARY OF THE PRESENT INVENTION

In abbreviated summary, the present invention provides, in this preferred embodiments, dual-action disconnect valve mechanism that simultaneously disconnects both tubes of the manometer from external pressure regions or sources, and/or a fluid displacement reservoir conveniently adjustable for varying the device's reservoir capacity and the height of liquid in the tubes, this adjustment being by a screw type adjustment which easily and conveniently achieves an accurate condition of the liquid levels being substantially exactly at the zero calibration marking.

In addition to the novelty of the device, the concepts may also be considered in terms of a novel procedure of filling a manometer tube to exactly the level as already marked as a calibration indicia on a scale which is already fixed to the tube.

Particular details are set forth in the more detailed description set forth herein.

PRIOR ART CAPABILITY AND MOTIVATIONS, AS HELPING TO SHOW PATENTABILITY HERE

In hindsight consideration of the present invention to determine its inventive and novel nature, it is not only conceded but emphasized that the prior art had details usable in this invention, but only if the prior art had had the guidance of the present concepts of the present invention, details of both capability and motivation.

That is, it is emphasized that the prior art had or knew several particulars which individually and accumulatively show the non-obviousness of this combination invention. E.g., a. The prior art has long had manometers and has realized the critical and often crucial need and usefulness of pressure measuring, including types of manometers of the "liquid-column" type, even manometers having a flexible scale;

b. The prior art knew the advantages of particular features and principles, and of their provision in a novel combination;

c. The prior art of manometer articles has realized the need to "zero in" the height of the liquid as a basis for pressure determination, although typically this has required very careful tube-filling procedures, or by movement of the scale relative to the liquid column, rather than easily manipulated mechanical means for adjustment of the height of the liquid column itself, by volume changes of the system;

d. The prior art has used the principle of screw revolvement as a means of varying the effective volume of an adjacent chamber, in several types of dispenser apparatus, and for position-adjustment of control members;

e. The prior art has surely supposed or known that many customers have been and surely would be quite willing to purchase the advantageous benefits of a novel manometer in large quantities, especially considering the huge usage of manometers in the various fields using pressure data or readings;

f. The relative ease of tooling and overall simplicity of this type of manometer have surely given manufacturers ample incentive to have made modifications for commercial competitiveness in a competitive industry, with huge sales prospects expectable;

g. The prior art has always had sufficient skill to make many types of manometers and similar devices, more than ample skill to have achieved the present invention, but only if the concepts and their combinations had been conceived;

h. Substantially all of the operational characteristics and advantages of details of the present invention, when considered separately from one another and when considered separately from the present invention's details and non-highly technical accomplishment of the details, are within the skill of persons of various arts, but only when considered away from the integrated and novel combination of concepts which by their cooperative combination achieves this advantageous invention;

i. The details of the present inventions when considered solely from the standpoint of construction, are relatively simple; and the matter of simplicity of construction has long been recognized as indicative of inventive creativity; and j. Similarly, and a long-recognized indication of inventiveness of a novel combination, is the realistic principle that a person of ordinary skill in the art, as illustrated with respect to the claimed combination as differing in the stated respects from the prior art both as to construction and concept, is that the person of ordinary skill in the art is presumed to be one who thinks along the line of conventional wisdom in the art and is not one who undertakes to innovate.

Accordingly, although the prior art has had capability and motivation, amply sufficient to presumably give incentive to the development of specialized manometers according to the present invention, the fact remains that the present invention awaited the creativity and inventive discovery of the present inventor. In spite of ample motivation and capability shown by the illustrations herein, the prior art did not suggest this invention to any person having ordinary skill in the art, considering the subject matter as a whole.

PRIOR ART AS PARTICULAR INSTANCES OF FAILURE TO PROVIDE ADVANTAGEOUS MANOMETERS

As cited herein, developments of manometers throughout many scores of years have been extensive and of various types.

Although there have been various types of manometers, each development has generally been toward one or more specific features, as is illustrated by the patents (Wozniak, U.S. Pat. No. 4,380,173 and Buchanan, U.S. Pat. No. 4,297,889) both shown as assigned to Dwyer Instruments, Inc., Michigan City, Ind. Both assert reference to scale-adjustment features for a basic Dwyer U.S. Pat. No. 2,662,409.

That is, the Buchanan patent generally relates to the particular improvement of the slidable mounting feature for the scale or calibration strip; and the Wozniak patent generally relates to a pusher lug or knob for manual zero setting of the scale strip, as a particular improvement to the particulars of the Buchanan patent.

Other prior art representations which were discovered by the present inventor after his discovery and invention, during his investigation of the likelihood of patenting, may be also considered as of particularized nature.

E.g., the early Goodman device (U.S. Pat. No. 1,643,886 of 1927) shows a U-tube manometer with a feature of a drainage valve disposed at the lower end of the device; and by hindsight, it presumably could be asserted that Goodman shows a form of liquid-height adjustment, although only uni-directional and of course wasteful and perhaps messy.

The Puig device (U.S. Pat. No. 2,603,210 of 1952) shows a liquid column manometer of collapsable nature such as for a blood pressure determination procedure. It features a special diaphragm or rubber bag within the air chamber for preventing contamination of the liquid as well as providing a pressure interface between the outside air and the air column within the tube.

The Jones device (U.S. Pat. No. 3,316,766 of 1967) particularizes an ejection means for removing and replacing the tubes of a mercury-column manometer. The Claff manometer (U.S. Pat. No. 3,365,948 of 1968) particularizes a construction having means provided to cause pressure changes in the two manometer tube arms to occur simultaneously, for avoiding surging and inconvenience.

The Troutman device (U.S. Pat. No. 4,535,634 of 1985) is quite complex as a manometer apparatus assertedly useful in a variety of different embodiments, yielding different applications of use. Calibration is shown by a scale-adjusting mechanism which shifts the scale lengthwise relative to the tube; and a well is vertically adjustable.

However, although these patents cite and trace a long development and a long recognition of the need for improvement of manometer devices, even showing certain some details of the present invention's flexible tube manometer, none show a dual-action disconnect valve and a fluid displacement reservoir having a convenient and accurate screw-type displacement adjustment for zeroing out the liquid levels in the fluid tubes.

SUMMARY OF THE PRIOR ART'S LACK OF SUGGESTIONS OF THE CONCEPTS OF THE INVENTION'S COMBINATION

In spite of all such factors of the prior art, the problems here solved awaited this inventor's present creativity. More particularly as to the novelty here of the invention as considered as a whole, the notation of prior art uses and needs help to show its contrast to the present concepts, and emphasizes the advantages, novelty, and the inventive significance of the present concepts as are here shown, particularly as to utility and convenience of uses as detailed herein.

Moreover, prior art articles known to this inventor which could possibily be adapted for this duty fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and to its provisions.

And the existence of such prior art knowledge and related articles embodying such various features is not only conceded, it is emphasized; for as to the novelty here of the combination and of the invention as considered as a whole, a contrast to the prior art helps also to remind both the great variety of the various prior art articles and the needed attempts of improvement, and of the advantages and the inventive significance of the present concepts. Thus as shown herein as a contrast to all the particularized prior art, the inventive significance of the present concepts as a combination is emphasized and the nature of the concepts and their effects can perhaps be easier understood.

Although varieties of prior art are conceded and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it in determinatively significant that none of the prior art shows the novel and advantageous specific concepts in combination, which provides the merits of this invention, even though certain details are shown separately from this accomplishment as a combination.

And the prior art's lack of an invention of a novel manometer, achieving the convenience, utility, simplicity of use and other advantages of the present invention, which are goals only approached by the prior art, must be recognized as showing a long-felt need fulfilled.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment, taken in conjunction with the accompanying Drawings, which are of somewhat schematic and diagrammatic nature for showing the inventive concepts; and in the Drawings:

FIGS. 2 and 3 are vertical elevation views of the manometer of FIG. 1, the reservoir body member means at the lower end of the vertical body member being shown in the position of the smallest volume system, and the valve member at the top of the vertical body member being shown in full lines in the blocking position of FIG. 1, although the control handle is also shown by chain lines in FIG. 3 as showing its position in which the upper valve means is open; and, more particularly:

FIG. 2 shows a front elevation or facing view of the manometer, and

FIG. 3 shows the manometer in side elevation view;

DETAILED DESCRIPTION OF THE PREFERRED EMBODIMENT

Figure 1:
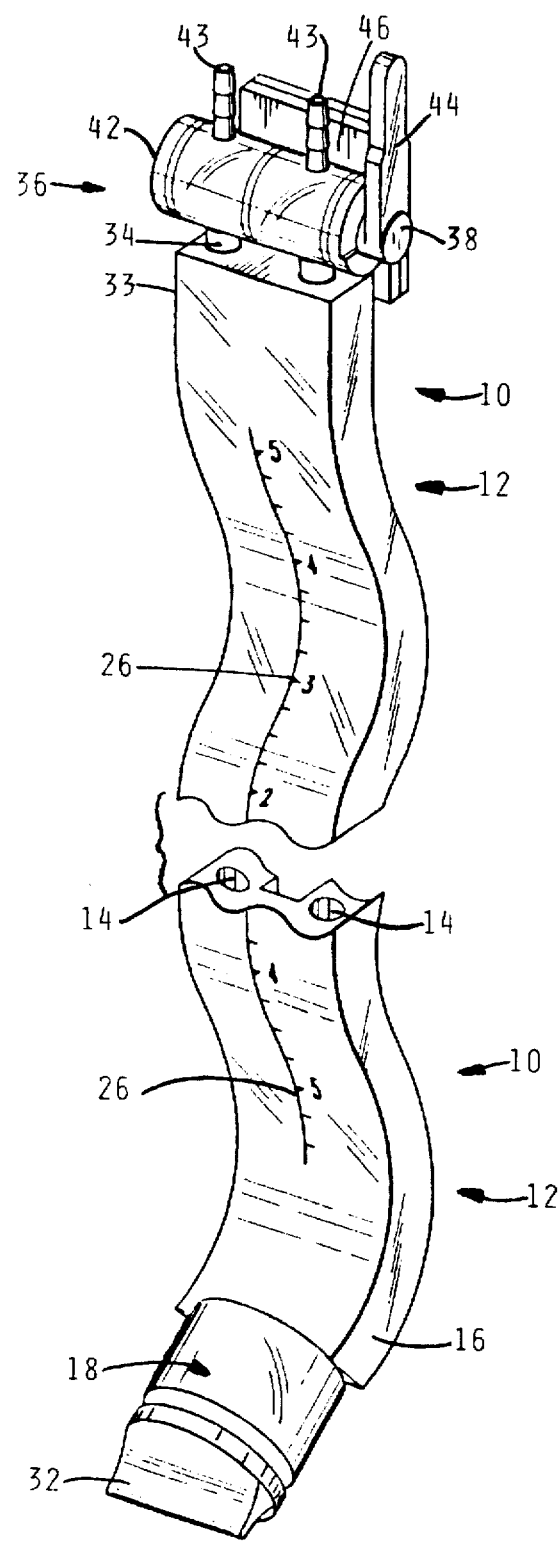
FIG. 1 is a pictorial view of a manometer according to the present invention, the vertical body member being shown as broken to illustrate the extreme upper and lower portions thereof, as shown in a loosely curving diagrammatic form for illustrating the flexibility of the vertical body member, with the upper valve control shown in the position of rotation in which both of the fluid channels are blocked.

As shown as a preferred embodiment in the Drawings, the present inventive concepts provide a novel device in the form of an advantageous manometer 10. The concepts provide that the manometer 10 comprises only a few parts, but they provide the advantages described.

Most conspicuous is an elongated strap-like flexible body member means 12, and the body member means 12 carries a pair of generally parallel hollow tubes 14 which are of translucent nature; and it is preferably from the material such as a PVC extrusion of which the strap 12 and tubes 14 are integrally formed.

The body member means 12 also carries, adjacent its lower end 16, a reservoir body means 18; and the lower end portions 16 of the tubes 14 fit respectively onto outlet nipples 20 which extend into a hollow chamber 21 provided in the reservoir body means 18.

The reservoir body means chamber 21 has a wall portion 22 of the chamber 21 which is screw-threadedly adjustable with respect to other portions of the reservoir body means 18; and the chamber 21 is in open communication with the lower end portions 16 of the tubes 14, this providing that the chamber 21 and the tubes 14 provide what might be described as a generally U-shaped interconnected volume system 24.

The tubes 14 and the elongated body means 12 are provided with scale calibrations 26 extending both upwardly and downwardly from a zero, calibration indicia 28 intermediate the ends of the tubes 14.

For providing the manometer's pressure-sensing operativity, the volume system 24 of the tubes 14 and the reservoir body means 18 receives and retains a volume of the liquid 30 (e.g., mercury or colored water) whose liquid level height in the tubes 14 depends upon the setting of the screw-threaded wall portion 22 and is adjustable in height by whatever is the resultant volume of the volume system 24 as caused by the particular setting of the wall 22.

Figure 4:
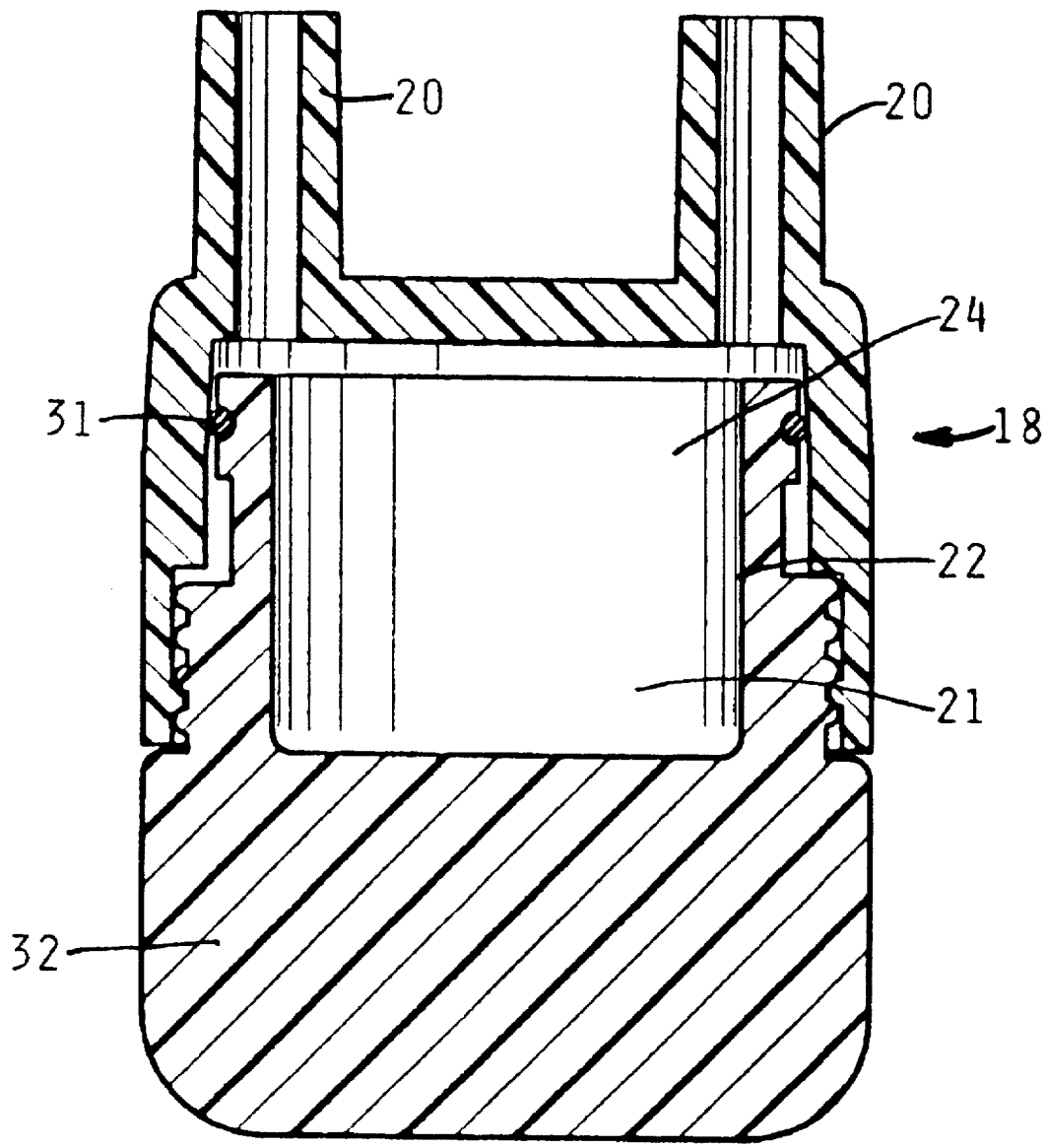
FIGS. 4, greatly enlarged from FIGS. 1–3, is a vertical cross-sectional view, this view showing the reservoir body means in the minimum volume system position of FIGS. 2 and 3.
Figure 5:
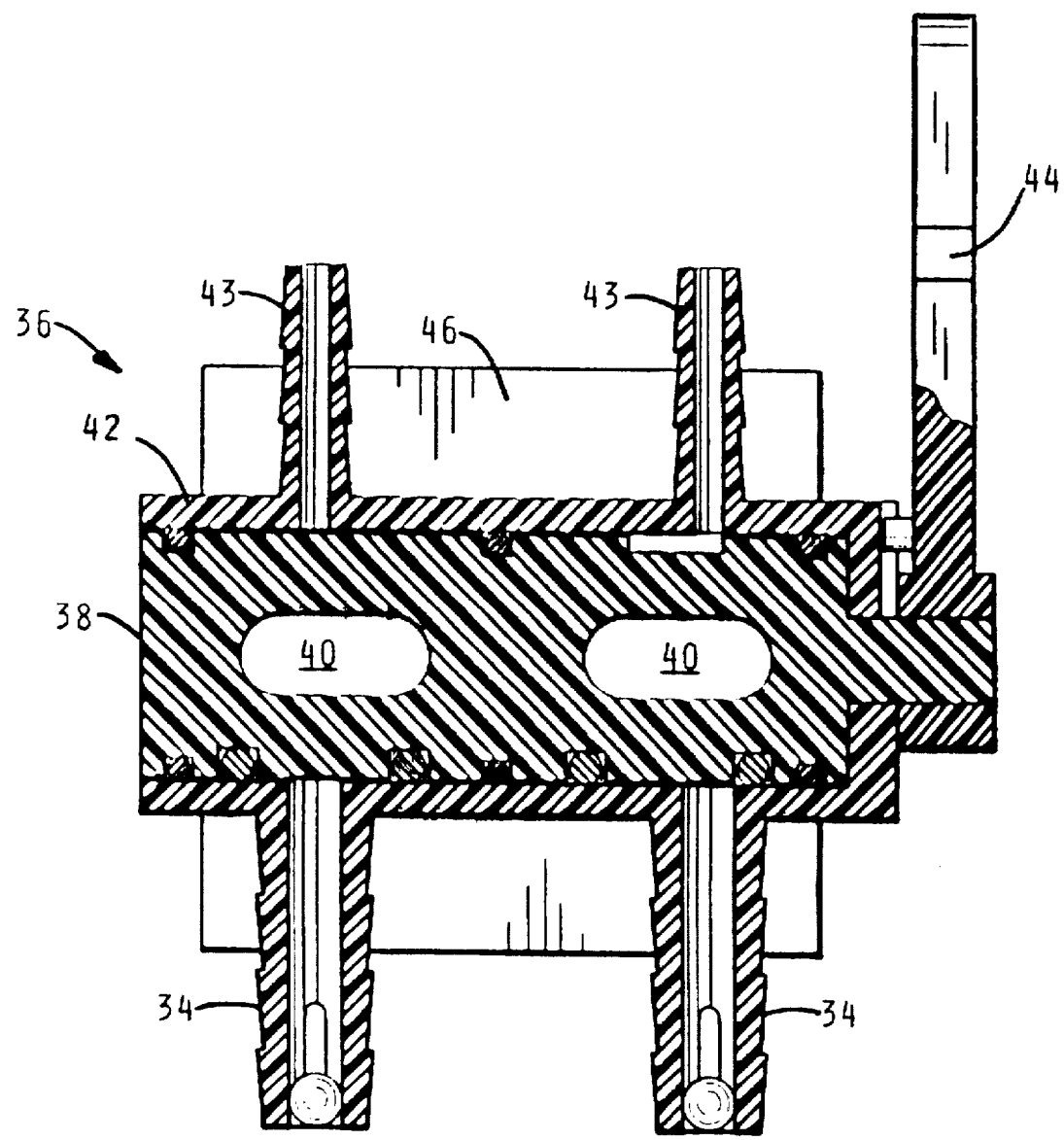
FIG. 5, in the generally enlarged scale of FIG. 4, is a vertical cross-sectional view of the upper valve, and with the control handle positioned in the conduit-blocking position of FIGS. 1–3.

As shown in the preferred form shown in the Drawings, the reservoir body means chamber 21 is formed to be of a generally cylindrical shape; and the adjustable wall portion 22 of the chamber 21 is provided as a cap member 32 which is screw-threadedly connected to the reservoir body means 18, and is movably and sealingly connected to it, such that a rotation of the wall portion 22 by rotation of the cap member 32 will vary the volume of the volume system 24, by varying the volume of the chamber 21. The seal is provided by an O-ring 31. (FIG. 4)

As now described, the upper end 33 of the strap-like body member means 12 is shown as carrying a pair of outlets 34 and a valve means 36 which communicates with each respective one of the outlets 34 in the upper end 33 of each respective tube 14; and the valve means 36 provides the operativity of providing, as to the interior of the valve means 36, simultaneously optionally open communication or close of communication to one tube 14 and its respective outlet 34 and the other tube 14 and its respective outlet 34.

Each of the outlets 34 extends downwardly from the interior of the valve 36, and fits into a nipple 37 at the top end 33 of each tube 14, the outlets 34 being spaced apart the proper amount such that the outlets 34 at the upper end 33 of the tubes 14 fit in proper registry with tube inlets 37.

Internally, the valve means 36 is provided to have a rotor, i.e., a cylindrical rotatable member 38 having independent passageways 40; and the rotatable member 38 is supported in the valve means 36, such that the rotatable member 38 has optional positions which provide optionally the open or closed condition via the valve means 36, i.e., of tube outlets 34 and their respective valve outlet nipples 37.

More particularly as to the valve means 36, the rotatable member 38 is shown as carried within the hollow bore of a stator member 42 which is connected to the upper end of the strap-like body member means 12; and the respective passageways 40 are located in the rotatable member 38 such that by rotation of the rotatable member 38 both of the respective passageways 40 will be optionally in communicative registry or non-registry with a respective one of the outlets 34/37, and connect, via passageways 40, with a respective outlet nipple 43 extending upwardly from the stator 42, the outlets 34 and 43 being a co-linear pair or set respectively providing the communication to the respective tube 14.

A handle 44 is shown for rotating the rotor 38.

Suitable sealing means, e.g., O-rings, are indicated in the Drawings.

Also, as a desirable option, the manometer 10 is provided with a magnetic holding plate 46, adding to the workability of the unit 10 as a portable unit.

As preferred, and as considered in the form of a process or procedure, it is to be noted that the calibration indicia 26 is already fixed to the tube 14 at the stage of filling the tubes 14 with the manometer liquid 30.

In operation, it is to be noted that varying the position of the wall means 22 to cause the top 48 of the liquid column 30 to be in registry with the calibration indicia 28, is without moving the calibration indicia 26 with respect to the liquid tube 14.

SUMMARY OF COMPONENTS AND OPERATIONAL DETAILS AND THEIR ADVANTAGES

The present invention as detailed herein has advantages in both concept and in component parts and features; for in contrast to other articles known to the inventor as to the prior art mentioned, the invention provides advantageous features which should be considered, both as to their individual benefit, and to whatever may be considered to be also their synergistic benefit towar the invention as a whole.

That is, although the particular features of a dual-action disconnect valve and a screw-thread adjustable fluid displacement reservoir are both desirable features in a flexible tube manometer, desirably both of those features are used in combination with the flexible tube manometer.

The concepts are also novel as a manufacturing procedure.

The prior art does not show or suggest either combination; and the preferred embodiment, as shown in the Drawings, advantageously uses both of those features in combination as is preferred.

Other features which are preferred are such prior art features as magnetic strips on the back of the main body member for holding the unit firmly in place, and check valve means associated with the valve means providing that the valve means serves as an over-pressure safety manifold with single action lever control as to both tubes. The body member which carries the tubes is preferably formed as a PVC extrusion integrally providing the fluid tubes, with a flexibility providing it to be coiled to fit a small carrying case for easy transportation; for the use and benefit of this invention will likely be for temporary pressure-sensing situations.

CONCLUSIONS AS TO INVENTIVE COMBINATION

It is thus seen that a liquid column type manometer, made and used according to the combination of inventive concepts and details herein set forth, provides novel concepts of a desirable and usefully advantageous article, yielding advantages which are and which provide special and particular advantages when used as herein set forth.

In summary as to the nature of the overall article's advantageous concepts, their novelty and inventive nature is shown by novel features of concept and construction shown here in advantageous combination and by the novel concepts hereof not only being different from all prior art known, even though various type manometers have been known and used for scores of years, but because the achievement is not what is or has been suggested to those of ordinary skill in the art, especially realistically considering this as a novel combination comprising components which individually are similar in nature to what is well known to most all persons, surely including most of the many makers and users of liquid manometers for a great number of years throughout the entire world. No prior art component or element has even suggested the modifications of any other prior art to achieve the particulars of the novel concepts of the overall combination here achieved, with the special advantages which the overall combination article provides.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all of the materials to all persons of the entire world, and the invention's relatively non-technical and openly-visible nature.

Quite certainly this particular combination of prior art details as here presented in this overall combination has not been suggested by the prior art, this achievement in its particular details and utility being a substantial and advantageous departure from prior art, even though the prior art has had similar components for numbers of year. And particularly in the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art of liquid column type manometer articles not achieving particular advantages here achieved by this combination.

Accordingly, it will thus be seen from the foregoing description of the invention according to the illustrative embodiment, considered with the accompanying drawings, that the present invention provides new and useful concepts of a novel and advantageous article, possessing and yielding desired advantages and characteristics in formation and use, and accomplishing the intended objects including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

The invention claimed is:

1. A manometer, comprising, in combination:

an elongated body member means;

the body member means carrying a pair of generally parallel hollow tubes of translucent nature;

the body member means also carrying, adjacent its lower end, a reservoir body means;

the lower end portion of said tubes extending into a hollow chamber provided in said reservoir body means;

the reservoir body means chamber having a wall portion thereof screw-threadedly adjustable with respect to other portions of said reservoir body means;

the adjustability providing optional settings of the wall portion;

the said chamber being in open communication with the lower end portions of the said tubes, such that the said chamber and the said tubes provide a generally U-shaped interconnected volume system;

the said tubes and the elongated body means being provided with scale calibrations extending both upwardly and downwardly from a "zero" calibration indicia intermediate the ends of the tubes;

the volume system of tubes and reservoir body means being adapted to receive and retain a volume of liquid whose liquid level height in the tubes depends upon the setting of the screw-threaded wall portion, and said setting provides adjustability of height of the liquid level, by the resultant volume of the volume system as caused by the particular setting of the adjustable wall portion;

in a combination in which the reservoir body means chamber is of a generally cylindrical shape, and the adjustable wall portion thereof is provided as a cap member which is screw-threadedly connected to the reservoir body means and is movably and sealingly connected thereto such that a rotation of said wall portion by rotation of the cap member will vary the volume of said volume system by varying the volume of the chamber.

2. A manometer having an elongated body member means which carries a reservoir body means chamber, and having tubes communicatively connected to the reservoir body chamber, the chamber and tubes providing a volume system which is receivable of measuring fluid, and the chamber having a movable wall portion, the chamber and the wall portion being screw-threadedly adjustable to provide various settings of the wall portion, the said adjustability correspondingly adjusting the height of the measuring fluid, by adjusting the volume of the volume system, in a combination in which the reservoir body means chamber is of a generally cylindrical shape, and the adjustable wall portion thereof is provided as a cap member which is screw-threadedly connected to the reservoir body means and is movably and sealingly connected thereto such that a rotation of said wall portion by rotation of the cap member will vary the volume of said volume system by varying the volume of the chamber.

* * * * *